Figure 4:
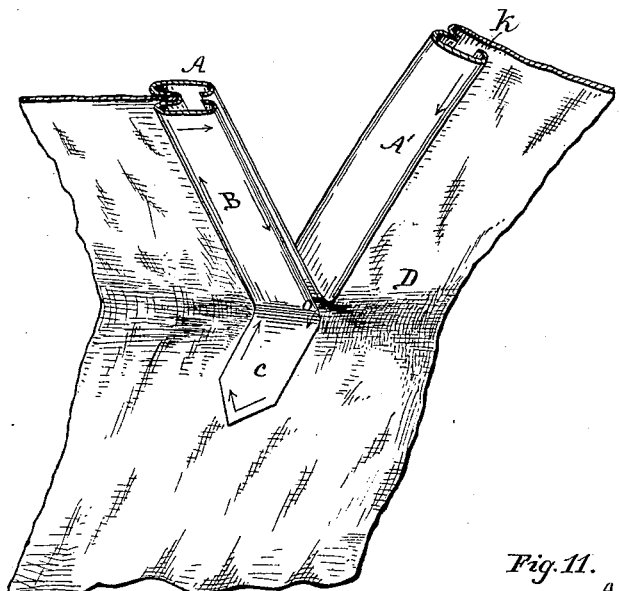

(No Model.) 3 Sheets—Sheet 1.
D. W. THOMPSON.
COMBINED BUTTON LAP AND STAY FOR GARMENTS.
No. 267,281. Patented Nov. 7, 1882.
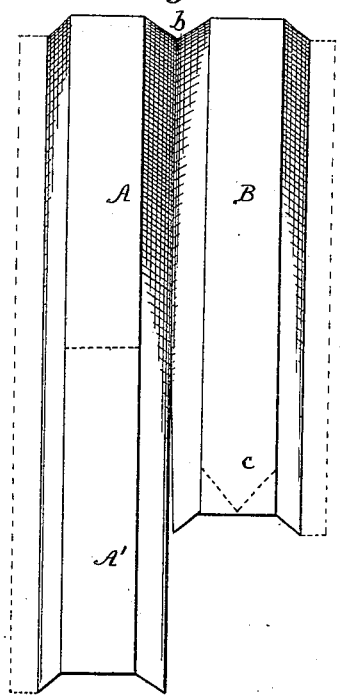
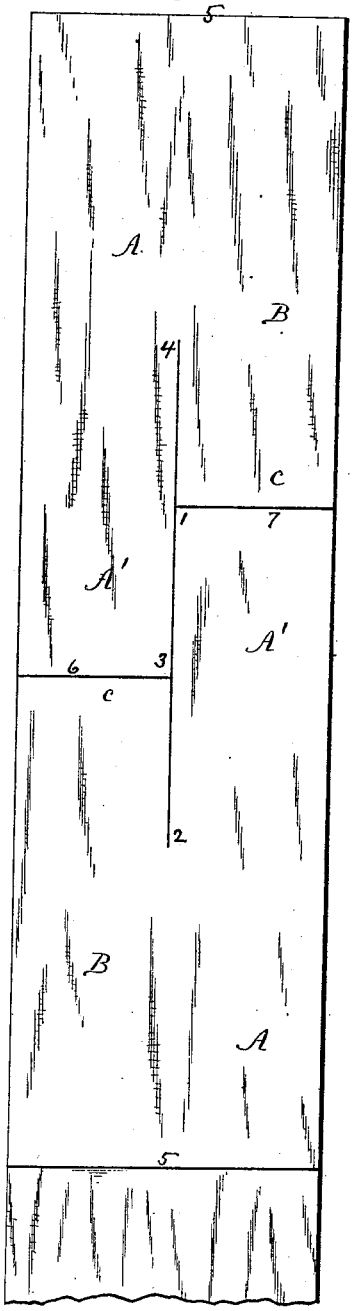
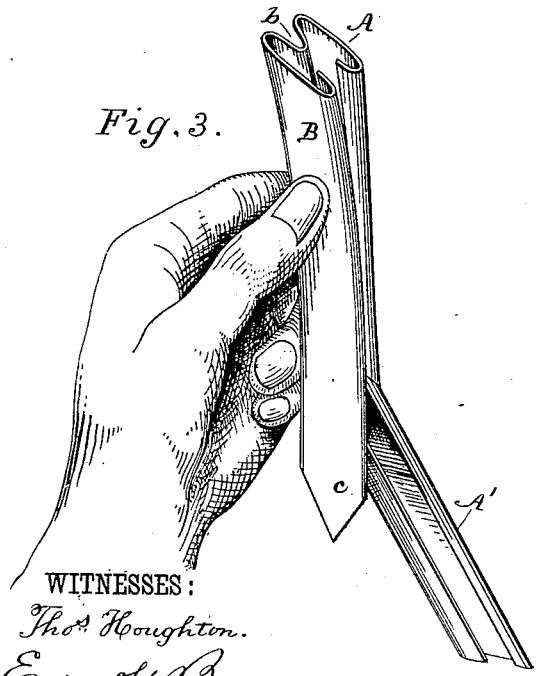
WITNESSES:
Thos. Houghton.
Edw. W. Byrn
INVENTOR:
D. W. Thompson
BY
ATTORNEYS.

(No Model.) 3 Sheets—Sheet 2.
D. W. THOMPSON.
COMBINED BUTTON LAP AND STAY FOR GARMENTS.
No. 267,281. Patented Nov. 7, 1882.

WITNESSES:
Thos. Houghton.
Edw. W. Byrn.

INVENTOR:
D. W. Thompson
BY
ATTORNEYS.

(No Model.) 3 Sheets—Sheet 3.

D. W. THOMPSON.
COMBINED BUTTON LAP AND STAY FOR GARMENTS.

No. 267,281. Patented Nov. 7, 1882.

WITNESSES:
Thos. Houghton.
Edw. W. Byrn.

INVENTOR:
D. W. Thompson
BY
ATTORNEYS.

United States Patent Office.

DAVID W. THOMPSON, OF ENGLEWOOD, ILLINOIS, ASSIGNOR OF ONE-THIRD TO JUSTUS MILLER, OF TROY, N. Y.

COMBINED BUTTON LAP AND STAY FOR GARMENTS.

SPECIFICATION forming part of Letters Patent No. 267,281, dated November 7, 1882.

Application filed February 24, 1882. (No model.)

*To all whom it may concern:*

Be it known that I, DAVID W. THOMPSON, of Englewood, in the county of Cook and State of Illinois, have invented a new and Improved Combined Button Lap and Stay for Garments; and I do hereby declare that the following is a full, clear, and exact description of the same, reference being had to the accompanying drawings, forming part of this specification.

My invention relates to a combined button lap and stay for the openings in garments, such as the openings at the neck or sleeves of shirts, the openings in the front or sides of drawers and overalls, or for plackets, pockets, or other similar openings.

In some of its features my invention herein described is an improvement upon that described and shown in my Patent No. 250,604, dated December 6, 1881, and in the fact that the blanks forming the staying-piece may be connected with the garment by a gutter-seam folded into the blanks. The latter, however, in this application differ in their fold-lines from those shown and described in patent before alluded to as granted to me.

It has for its objects the more economical cutting of the piece which forms the combined button lap and stay; secondly, the hiding of stitches by the introduction of a blind seam arranged in peculiar relation to the body fabric; thirdly, to facilitate the work of attaching the inserted piece in the body fabric, and, fourthly, to relieve the point of the slit in the body fabric of tearing strain. For accomplishing these results my invention consists in the peculiar construction and arrangement of the parts, as will be hereinafter fully described with reference to the drawings, and then pointed out in the claims.

In older inventions in this field it will be observed that the point of the slit in the body fabric—the weakest point—which it is sought to protect from ripping or tearing strain, is located at the apex of the angle of the inner edge of the opening, or at the apex of the angle of the outer edge of the opening of the finished work, where it is necessarily exposed to strain in adjusting the garment.

The object and scope of my invention are to remove the point of the slit in the body fabric (the weakest point) from both edges of the opening and to protect it from all strain. To do this I attach the fly or staying-piece formed so as to have a deep fold or a hem of suitable width to one of the sides of the slit in the garment by a seam, and I connect with this seam a short transverse anchor-seam extending between the point of the slit in the body fabric and the adjacent external fold-line of said fold or hem forming one edge of the opening, thus anchoring the apex of the angle of said edge in solid cloth. The said transverse anchor-seam, being short, may be doubled or strengthened by or composed of a metal clip, or a loop or tie of silk or linen, or any other suitable material, where subjected to a very great strain.

Figure 5:
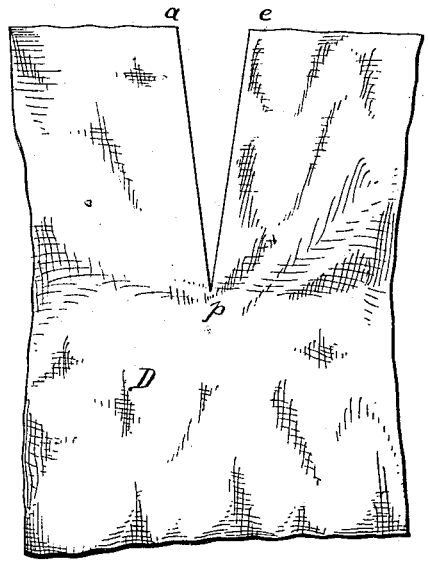
Figure 11:
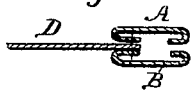
Figure 7:
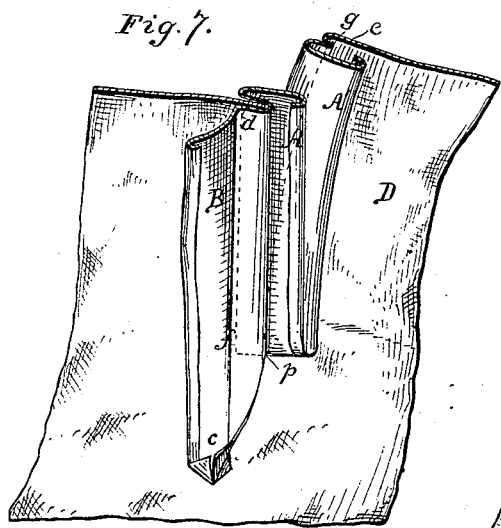
Figure 8:
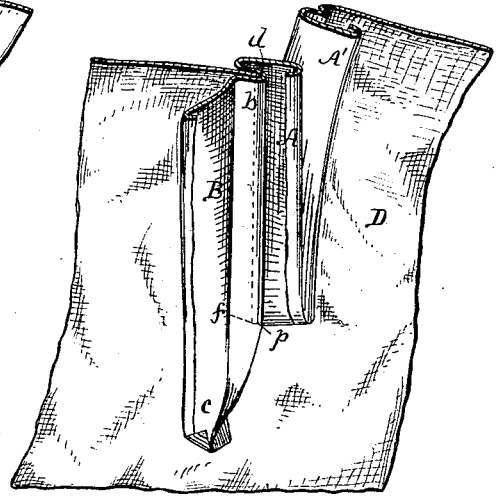
Figure 6:
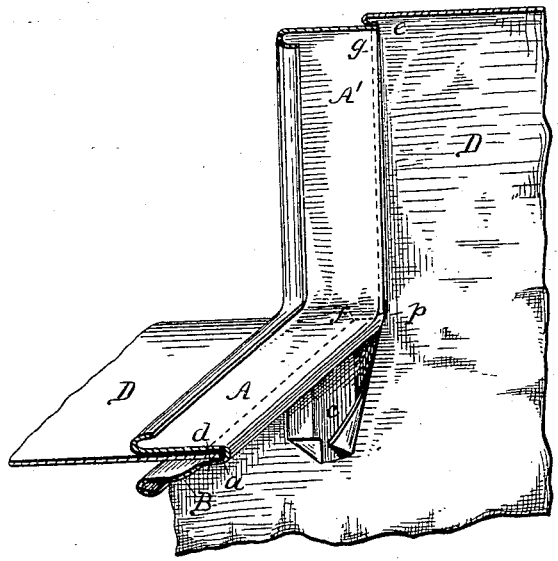
Figure 9:
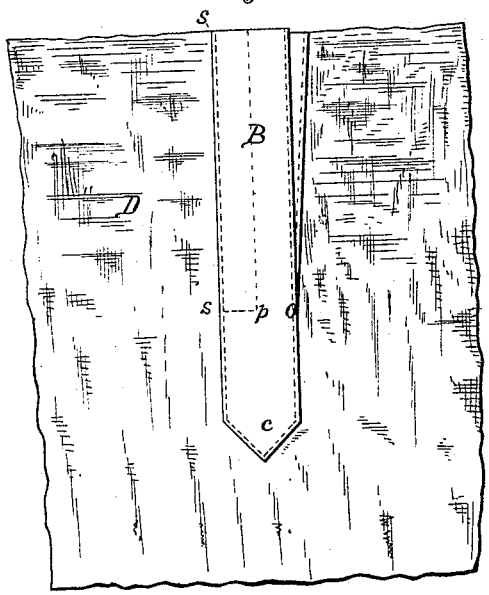
Figure 10:
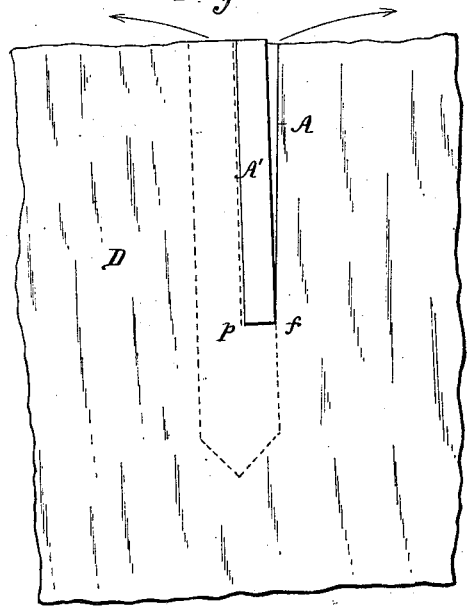

Figure 1 is a view of a strip of material, showing how the blank for the combined button lap and stay is cut without any waste of material. Fig. 2 is a perspective view of the blank as folded inwardly to form the re-entrant fold or gutter-seam *b*. Fig. 3 is a perspective view of the combined button lap and stay as perfectly creased and folded. Fig. 4 is a perspective view, showing the application and relation of the combined button lap and stay to the slitted body fabric, as shown in Fig. 5. Fig. 5 represents the body fabric having a plain straight slit in the same to form the opening for the combined button lap and stay. Fig. 6 shows in perspective view the first step of uniting the combined button lap and stay to the body fabric by the blind seam, the edge *a p* of the body fabric being entered into the re-entrant fold *b*, Fig. 5, of the combined button lap and stay and the piece connected to the body fabric by the blind seam *d f p g*. Fig. 7 shows a view similar to Fig. 6, except that the fly-linings A A' have been folded over and the facing B brought forward preparatory to having its terminal edge united to the terminal edge of A. Fig. 8 is the same view, showing a modified arrangement of the blind seam. Fig. 9 is a front or outside view of the completed article; Fig. 10, a back or inside view of the same, and Fig. 11 is a cross-section taken through the outer button-fly, showing a modification which will be hereinafter described.

Referring to Figs. 1, 2, 3, a strip of material of the proper dimensions, as in Fig. 1, is divided, either by machinery or hand, into sections or blanks A A' B c, each of which is an exact duplicate of the other, and which utilize the material with absolutely no waste whatever. The shape of the sections A A' B c is a solid rectangle at one end, while its other end is divided by a longitudinal slit, extending up into the body of the piece to a point half-way the greatest length of the blank, and the two branched ends A' and c being of different lengths, as shown. Of this blank the part A forms the inner lining of the upper button-lap, A' the outer lining of the under button-lap, and B c the facing. This blank is first creased and folded in its middle longitudinal line coincidently with the slit in its end to form the re-entrant fold b, and its edges are also creased and folded, and the parts A and B then doubled upon each other, as shown in Fig. 3, in which condition the combined button lap and stay becomes an article of manufacture, which may be made and sold to consumers in quantity in an economical manner and ready to be applied to the slits of any garment to which they may be applicable. Instead, however, of actually creasing and folding the article, as shown in Fig. 3, the blank shown in Fig. 1 may have marks thereon indicating the line of crease and cut to accomplish the same result. In laying off or marking the strip the transverse lines 5 extend all the way across, the transverse lines 6 and 7 extend half the way across, and the line 2—4 extends longitudinally down the middle past lines 6 and 7.

It is essential to my invention that the distances 1 to 2 and 3 to 4 should each be exactly half the full length, A A', of the blank; and this is a novel feature, which distinguishes my invention from what has preceded it. Now, to apply this piece shown in Fig. 3 to the body of the garment slitted as in Fig. 5, the re-entrant fold b is fitted over so as to receive the edge a p and the facing B c folded back out of the way, as in Fig. 6. The blind seam d f p g is then run, of which the part d f unites to the body of the fabric D, the edge of facing B on the front side and the edge of the lining A on the other side passing through the three thicknesses of the outer button-fly without making a visible seam on the facing. The blind seam then runs transversely, as at f p, securing a function which will be hereinafter described, and then runs up from p to g, connecting the edge of the lining of the under button-fly to the edge e p of the body fabric. The work is then disconnected from the machine, the linings A and A' brought forward, as in Fig. 7, the facing B then folded with its terminal edge against the terminal edge of A, and the work then is in the position of Fig. 4, completely hiding the blind seam. The machine is now connected at the point k, Fig. 4, and the line of stitching is run down, connecting the edge of A' to the body fabric D, crosses over at o onto the facing, runs around stay c in the direction of the arrows, runs up on the opposite side of the facing B, crosses over at the top, and then runs down the terminal edges of B and A, connecting them, and completes the work at o, thus requiring only one operation under the machine after the blind seam is run. The work, when done and straightened out, then presents outside the appearance shown in Fig. 9 and inside the appearance shown in Fig. 10.

In describing more clearly the distinctive features of the blind seam and its values, I would state with respect to my previous patent that in that patent the body material was stitched in the re-entrant angle, but not by a blind seam and not at a line remote from the edge a p. By the use of the blind seam I am enabled to finish the external or visible rows of stitching in one operation, as shown in Figs. 4 and 9, and also to remove the main finishing-seam s s, Fig. 9, to one side of the edge of the slit, and by further removing the line of the blind seam d f from the edge a p to a point back of this I get a transverse blind anchor-seam f p, which removes the strain on the body of the fabric from the bottom or point p of the slit to the point f when the stitches have a firm anchorage in the body of the goods, thus strengthening the bottom of the opening. This distinction will be best understood from Fig. 10, which is an inside view, the arrows indicating the direction of strain in pulling off a shirt, which strain, it will be seen, will be borne by the line of stitching p f, and will be borne principally at f, which is removed from the bottom or point p of the slit in the body fabric. This anchor-seam f p may be at right angles to the main blind seam d f, as shown in Fig. 7, or it may be arranged obliquely, as in Fig. 8, to better resist the oblique pull indicated by the arrows in Fig. 10.

In some cases I may not run the main blind seam at a remote point from the edge a p of the fabric, but may run it close to said edge, still preserving, however, the deep re-entrant fold, the equal width of the facing B and lining A, and the transverse blind anchor-seam f p, as shown in Fig. 8.

As so far described I have considered the combined button-lap and stay as made in one piece. I may, however, divide it in two pieces by a line running through the re-entrant fold and the stay-slit, and still preserve the benefits arising from the blind seam, its removal from the edge a p of the body fabric, and the advantages of the transverse blind anchor-seam f p. In this modification the facing B c will be a separate piece from the linings A A', and a cross-section of the upper button-lap will appear, as in Fig. 11. The stay c, I prefer to use in connection with my invention; but it is not an essential element thereof.

Having thus described my invention, what I claim as new is—

1. The combination, with the body fabric having a straight slit, as described, of a facing, B, and a continuous button-fly lining, A A', the part A of the said lining and the facing B being united on opposite sides of one of the free edges of the slit in the body fabric by a single line of stitches, forming a blind seam, substantially as described.

2. The combination, with the body fabric having a straight slit, as described, of a facing, B, and a continuous button-fly lining, A A', the part A of the said lining and the facing B being united on opposite sides of one of the free edges of the slit in the body fabric by a single line of stitching, forming a blind seam, and the button-flaps stayed at the bottom of the slit by a transverse blind anchor-seam, $f p$, substantially as and for the purpose described.

3. The combination, with the body fabric having a straight slit, as described, of a facing, B, and a continuous button-fly lining, A A', the part A of said lining and the facing B being united on opposite sides of one of the edges of the body-slit by a single line of stitching removed from the said edge and forming a blind seam, $d f$, and then continued to form the transverse seam $f p$, as and for the purpose described.

4. The button-lap and facing made in one piece with a facing, B, and continuous button-lap lining A A', creased to form a re-entrant fold and gutter-seam, $b$, combined with the slitted body fabric, and having the sides of said re-entrant fold and gutter-seam united on opposite sides of the edge of the slit in the body fabric by a single line of stitching, forming a blind seam, substantially as described.

5. As a new article of manufacture, the combined button-lap and facing, consisting of the blank cut to form a facing, B, and button-fly linings A A', creased and folded longitudinally to form the re-entrant fold $b$, substantially as shown and described.

6. As a new article of manufacture, a strip of material made of the width of the button-flap and stay-blank, and divided by marks into symmetrical edges of severance without waste, to indicate the line of cut which forms the blank, the said lines of severance being transverse lines 5, running entirely across the strip, transverse lines 6 and 7, running half the distance across, and a middle longitudinal line, 2—4, with the distances from 1 to 2 and from 3 to 4 exactly equal to half the full length, A A', of the blank, as shown and described.

7. In a combined button-fly and stay-piece of a garment, the combination of a seam connecting the said stay-piece to one side of the slit, away from the edge of the fabric in which the latter is formed, and a transverse anchor-seam connecting said seam with the edge of the inner staying-piece and extending between the point of the slit and the adjacent fold-line of said staying-piece, as and for the purposes set forth.

The above specification of my invention signed by me in the presence of two subscribing witnesses.

DAVID W. THOMPSON.

Witnesses:
  EDWD. W. BYRN,
  CHAS. A. PETTIT.